United States Patent Office 3,440,430
Patented Apr. 22, 1969

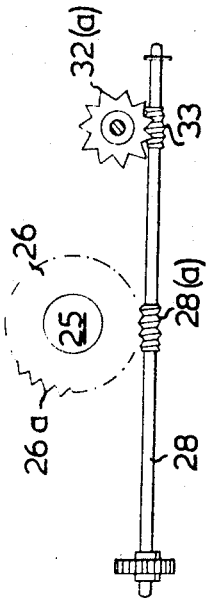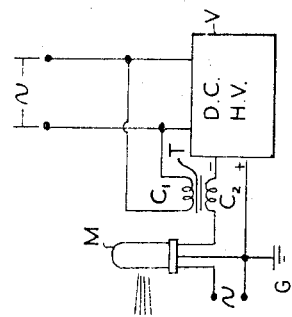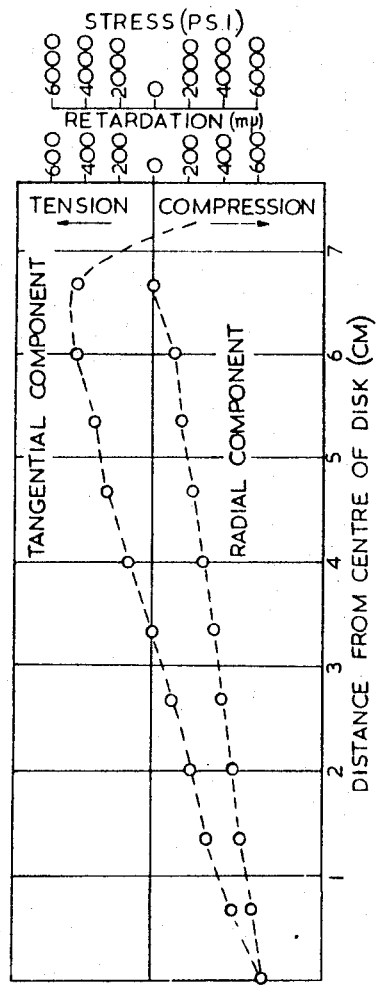

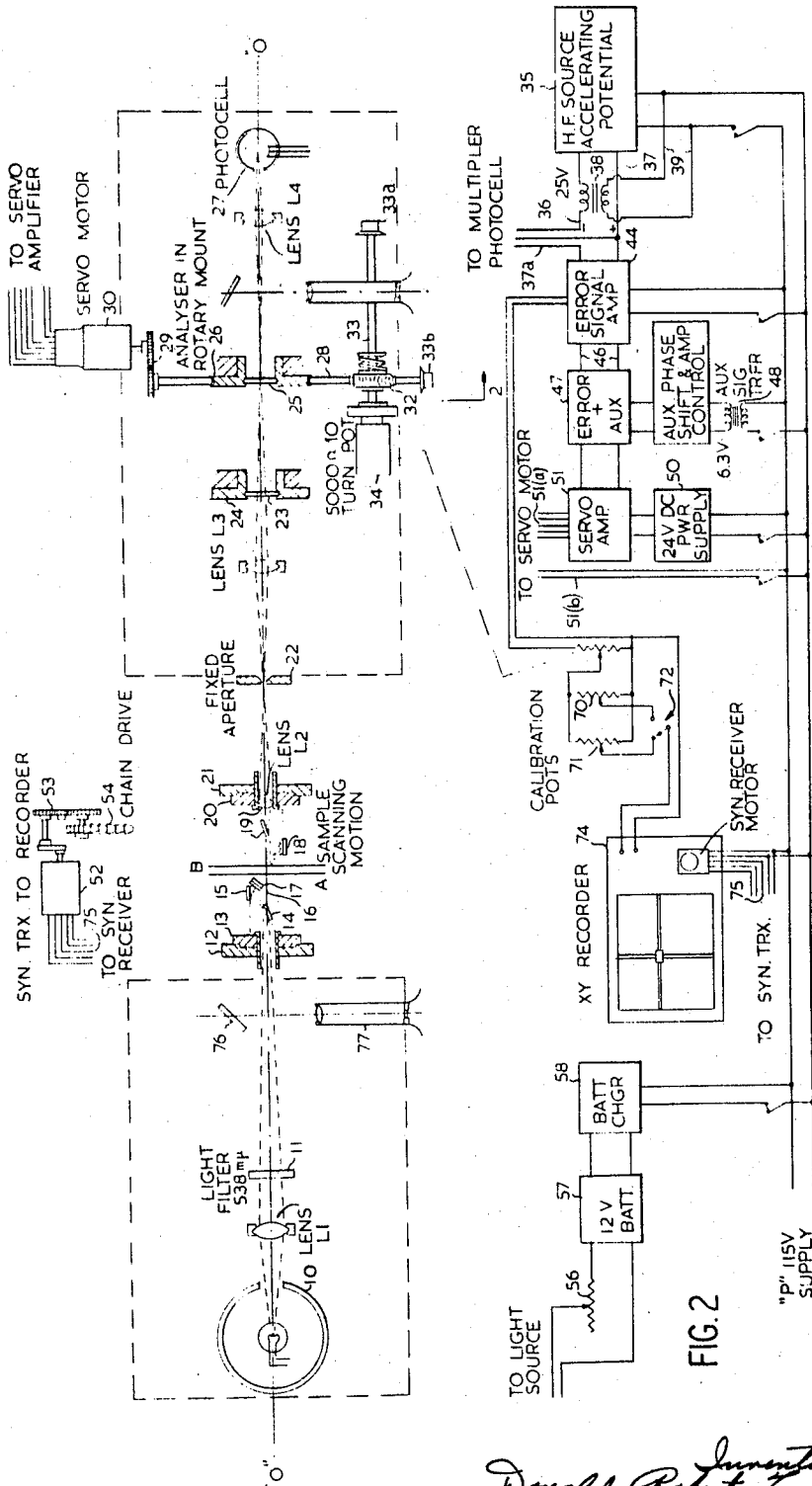

3,440,430
STRESS INSPECTION APPARATUS WITH SINE WAVE MODULATION OF THE PHOTOMULTIPLIER TUBE OUTPUT
Donald R. Tansley, Oshawa, Ontario, Canada, assignor to Pittsburgh Plate Glass Company, Pittsburgh, Pa.
Filed Dec. 27, 1965, Ser. No. 516,624
Int. Cl. G01n 21/30
U.S. Cl. 250—219                                    3 Claims

ABSTRACT OF THE DISCLOSURE

Apparatus for detecting and recording stresses and their distribution in the sheet of transparent material. The instrument consists basically of a Senarmont compensator in which the analyzer element is automatically rotated to the balanced position by means of a servo system. The system includes a servo motor adapted to drive an optical analyzer. The servo motor is responsive to the resultant of a signal produced by a photomultiplier tube which receives light passing through the analyzer, and an auxiliary signal having a frequency equal to the frequency of the error signal but having a phase opposite thereto. The servo motor responds to the resultant signal by rotating the analyzer in a direction determined by whether the error signal increases or decreases in amplitude relative to the auxiliary signal. The system is thereby capable of distinguishing between tension and compression stresses in the transparent sheet material being analyzed. The system provides for fluctuation of the multiplier phototube output by superimposing a relatively small alternating voltage on the direct current accelerating potential supplied to the multiplier phototube. The net output signal of the phototube has the same frequency as the signal superimposed on the accelerating potential and an amplitude proportional to the light incident thereon.

---

The invention relates in one aspect, to an improved multiplier phototube circuit.

This invention relates, in a further aspect, to a photoelastic stress analyzing system incorporating an improved multiplier phototube circuit.

In co-pending U.S. application Ser. No. 516,405 filed Dec. 27, 1965 there is described and claimed a stress analyzing system for determining stresses in sheet material and incorporating a Senarmont compensator wherein the analyzer component thereof is automatically rotated to a balanced position by means of a servo-motor which is responsive to the amplitude and phase of input signals fed thereto. Part of the input signal to the servo-motor is derived from the error output signal of a light sensitive tube positioned to receive light transmitted through the analyzer component of the compensator. As the servo-motor requires that an alternating input signal be provided thereto, the system described in the above co-pending application provides for the mechanical "chopping" of the light beam entering the photocell thereby causing the photocell output to fluctuate in accordance with the "chopping" of the light. The fluctuating photocell output signal is then combined with an auxiliary signal having an equal frequency and a phase opposite to the phase of the photocell signal, and the combined signals are then fed into the servo-motor referred to above. The servo-motor acts on command of the combined signals to rotate the analyzer to a balanced position, the amount of rotation required to balance the system being related to the stress pattern in the sheet of material being examined. A recorder coupled to the analyzer plots the position of same as the sheet is examined thereby to give an indication of the stresses in the latter.

Although the multiplier phototube circuit of the present invention is applicable to a great number of systems, it finds particular utility in the stress analyzing system referred to above. By incorporating the multiplier phototube circuit in said stress analyzing system the necessity of mechanically "chopping" the light transmitted through the analyzer to the light sensitive cell is eliminated; instead the present invention provides for the electronic modulation of the output of the multiplier phototube thereby to provide an alternating output from said tube even when the light input thereto is substantially constant.

It is therefore an object of the present invention to provide a multiplier phototube circuit capable of producing a fluctuating output when the light input to the multiplier phototube is substantially constant.

It is a further object of the present invention to provide an improvement in an automated photoelastic stress analyzer utilizing the Senarmont principle.

The present invention therefore relates, in one aspect thereof, to a multiplier phototube circuit, said circuit including a multiplier phototube. A source of high voltage accelerating potential is connected to an input of said phototube. Means are provided for superimposing an alternating signal on the high voltage accelerating potential supplied to said phototube thereby to vary the amplification factor of the latter in accordance with said alternating signal. The superimposed signal causes the output of said phototube to alternate in accordance with said signal when a steady light beam is incident upon said tube.

The present invention relates in another aspect, to a stress analyzer system incorporating a Senarmont compensator, said system including as a part of its combination a multiplier phototube circuit.

A specialized optical system converts the light passing through the specimen to a linearly polarized beam, and it is known that the angular orientation of the linearly polarized light changes in accordance with the stress in the area being scanned. An optical analyzer is mounted in the path of the linearly polarized light, and the analyzer is rotatable between a position wherein the linearly polarized light is extinguished and another position wherein a portion at least of the light is transmitted, with the intensity of the transmitted light being proportional to the angular displacement between the position for extinction of the analyzer, and the orientation angle of the linearly polarized light. It is therefore apparent that the orientation angle of the linearly polarized light may be detected by constantly positioning the optical analyzer such that the intensity of the transmitted light remains constant. The stress analyzer therefore incorporates means which produce a signal responsive to the intensity of the transmitted light, and a servo-motor operatively connected to the analyzer and which acts on command of the signal to constantly position the analyzer such that the intensity of the light transmitted through the analyzer, and hence the characteristics of the signal received by the servo-motor approach a predetermined or balanced condition. The means for producing a signal responsive to the intensity of the transmitted light include a multiplier phototube positioned to receive light passing through the analyzer. Means are provided causing the amplification factor of the phototube to fluctuate such that the phototube emits a fluctuating error signal when light is incident thereon. Further circuit means act to produce and superimpose an auxiliary signal of equal frequency and opposite phase upon the error signal and the resulting signal is received by the servo-motor. The servo-motor is responsive to the phase characteristics of this signal and acts to rotate the analyzer to change the intensity of the transmitted light and hence the characteristics of the resulting signal until a balanced condition is achieved. Indicating means driven in conjunction with the analyzer furnish a representation of the stresses in the specimen being examined.

Further objects and aspects of the invention as well as a fuller understanding thereof may be obtained from the following description read in conjunction with the drawings and in which:

FIGURE 1 is a schematic diagram of the multiplier phototube circuit.

FIGURE 2 is a schematic diagram of the recording photo-elastic stress analyzer incorporating the multiplier phototube circuit.

FIGURE 3 is a view showing a portion of the means for rotating the analyzer taken along lines 3—3 of FIG. 2 and looking in the direction of the arrows.

FIGURE 4 is a diagram illustrating plots recorded by the system of the present invention.

Figure 5:
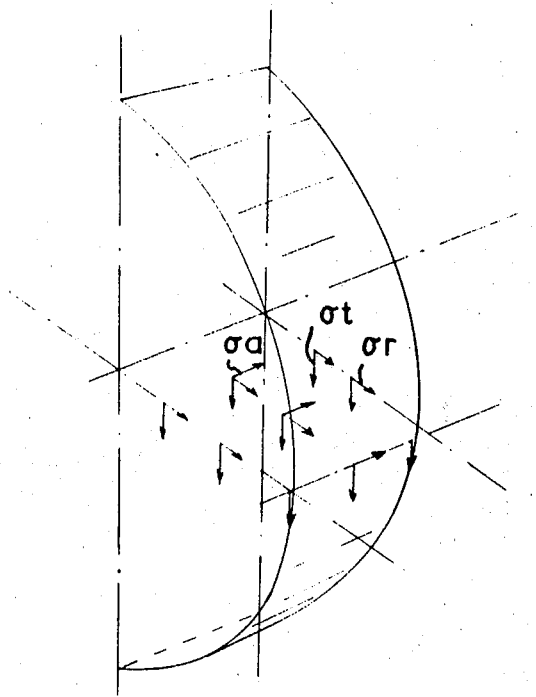
FIGURE 5 is a diagram of the stresses within the specimen from which the plots of FIGURE 4 were recorded.

With reference to FIGURE 1, there is shown a conventional multiplier phototube M provided with a D.C. source V of accelerating potential, the negative side of the source being connected to the cathode of the multiplier phototube M while both the positive side of the source and the anode of the phototube are connected to ground as at G. In accordance with the preferred embodiment of the invention the negative lead to the photocell cathode has a coil C2 serially connected therein. The coil C2 forms the secondary of a transformer T having a primary coil C1 across which is applied an alternating signal, for example 60 cycle at an approximately 115 volts potential. Transformer T acts to superimpose a 60 cycle alternating potential on the D.C. accelerating input to the phototube M and since the amplification factor of a photomultiplier tube varies as the applied accelerating potential, the output signal OP of the tube which appears between the output terminal and the anode will fluctuate at 60 cycles per second for any steady incident light beam thereon.

The circuit described above is particularly well suited for use as a part of the combination of a stress analyzer system.

In order to understand the stress analyzer system to be more fully described hereinafter a brief review of certain principles behind the stress analyzing system is presented.

Photoelastic stress analysis is based on the principle that the components of polarized light vibrating in the directions of the principal stresses are relatively retarded in proportion to the difference of the principal stresses. This may be expressed as:

$$R = Ct(p-q) \quad (1)$$

where

R is the relative retardation
C is the stress optical coefficient
t is the thickness of the specimen and p and q are the principal stress components.

The stress analyzer system incorporating the multiplier phototube circuit described utilizes the Senarmont principle. This principle is well known in the art and will not be fully discussed here. It is sufficient to state here that the Senarmont system incorporates a light source and an optical system which directs polarized light through the specimen being examined and intercepts the relatively retarded and elliptically polarized light leaving the specimen which is assumed to have stresses therein, and thereafter converts the elliptically polarized light to linearly polarized light which is angularly oriented in proportion to the retardation of the light which has arisen by virtue of the stress in the specimen. The linearly polarized light is then intercepted by an analyzer. Since the latter may be angularly oriented to block the linearly polarized light, it is apparent that the changes in relative retardation of the light due to stress changes in a specimen being scanned may be detected by changing the angular position of the analyzer such that the light energy is constantly blocked or alternatively, partially blocked by a constant amount.

The stress analyzing system is flexible and is well suited to both normal and oblique incidence methods of analysis. In the normal incidence method the beam of polarized light is directed through the specimen at right angles with the plane of light polarization at 45° to the direction of principal stress. When using the latter method, the analyzer gives a plot of relative retardation and hence indicates the variation in the difference of principal stresses as expressed in Equation 1 above.

The oblique incidence method of analysis utilizes a system of mirrors to cause the polarized beam of light to pass through the sheet specimen at an oblique angle. The incident beam is rotated about one of the stress components in a plane containing the normal and the second stress components. Thus if the incident beam is rotated about the $q$ component to make an angle of incidence of $\theta$ degrees to the $p$ component, Equation 1 becomes:

$$R_A = \frac{Ct}{\cos \theta}(p \cos^2 \theta - q) \quad (2)$$

where $t/\cos \theta$ is the extended path length and $p \cos^2 \theta$ represents the resolution of the $p$ component ($p \cos \theta$) and rotation of its plane of action through the angle $\theta$.

The magnitudes of $p$ and $q$ may be determined by solving Equation 2 together with that resulting from rotating the incident beam about $p$, thereby obtaining a projected component of $q$. This method leads to the following equations relating $p$ and $q$ to the measured retardations $$p = \frac{\cos^3 \theta}{Ct(1-\cos^4 \theta)} R_A - \frac{\cos \theta}{Ct(1-\cos^4 \theta)} R_B \quad (3)$$

$$q = \frac{\cos \theta}{Ct(1-\cos^4 \theta)} R_A - \frac{\cos^3 \theta}{Ct(1-\cos^4 \theta)} R_B \quad (4)$$

Substitution of the following numerical values in the above equations leads to the appropriate expressions for $p$ and $q$ in pounds per square inch in terms of the retardations $R_A$ and $R_B$ in millimicrons.

where $\theta = 25°$
$C = 2.68$ Brewsters and $t = 7/32$ inch $$p = 22.0 R_A - 26.8 R_B \quad (5)$$
$$q = 26.8 R_A - 22.0 R_B \quad (6)$$

These equations permit calculation of the principal stress components, $p$ and $q$, from the retardation measured by the oblique incidence instrument. As is customary in the glass industry, $p$ and $q$ may be expressed in terms of retardation in millimicrons produced by them. For $t = 7/32$ inch
$R_p = p/9.74$
$R_q = q/9.74$ and Equations 5 and 6 reduce to $$R_p = 2.26 R_A - 2.75 R_B \quad (7)$$
$$R_q = 2.75 R_A - 2.26 R_B \quad (8)$$

The two equations given above enable us to calculate principal stress values by subtracting two plots of retardation taken across any particular specimen, the difference being the stress value desired.

Since the oblique incidence method is preferred the system which will be more fully described hereinafter is particularly adapted to carry out this method. It should be realized, however, that with suitable modifications thereto that the system may carry out normal incidence analysis as well.

To illustrate this latter point reference is made to the oblique incidence optical unit designated in FIGURE 2. By simply removing the oblique incidence unit and replacing same with a single polarizer plate positioned normal to the optical axis of the system, the system is enabled to carry out normal incidence analysis. The path of scan for normal incidence analysis is, of course, normal to the optical axis of the system and passes intermediate the polarizer and the fixed aperture 22.

Referring particularly to the drawings there is seen in FIGURE 2 an optical system having an optical axis 0—0. At one end of the optical axis is located a tungsten lamp 10 which receives a constant supply of D.C. power from a battery 57, the potential at lamp 10 being regulated by means of the rheostat 56. A charger 58 operating from a 115 v. 60 cycle A.C. supply keeps the battery at constant potential.

The white light emitted from the lamp 10 passes through a lens L1 located on the optical axis and is focused on the specimen which is to be scanned and which is located on the path A–B. The beam of light converging from lens L1 is rendered monochromatic before reaching the specimen by means of a 538 millimicron interference filter located on the optical axis between the lens L1 and the sample.

Immediately before reaching the sample the light beam is deviated first by mirror 14 and thereafter by mirror 15 such that the light reflected off mirror 15 cuts across the optical axis at an oblique angle. Mirrors 14 and 15 conveniently have aluminized surfaces and they are mounted by sutiable brackets upon a disc 13 which is rotatably mounted in a bushing 12, thereby providing for rotation o fthe mirrors 14 and 15 about the optical axis 0—0. Also mounted on the disc 12 and in and normal to the path of the light reflected from mirror 15 towards optical axis 0—0 is a polarizer 16 and a quarter wave plate 17. The polarizer 16 is oriented such that the light is linearly polarized at 45° to the plane of incidence of the light reflected off mirror 15. Quarter wave plate 17 subsequently circularly polarizes the light just before the light converges and enters the specimen on path A–B. The beam leaving the specimen is elliptically polarized due to the relative retardation produced by stresses in the sample. A second mirror system comprising mirrors 18 and 19 deviates the light beam leaving the sample back to the optical axis 0—0 changing slightly the elliptical polarization. Mirrors 18 and 19 are mounted for rotation about the optical axis in the same manner as are mirrors 14 and 15, that is, they are mounted on disc 20 by brackets (not shown) and disc 20 is rotatably mounted in bushing 21.

The rotatable mounting assembly for mirrors 14, 15, 18 and 19 permits the whole mirror system to be rotated about the optical axis such that the mirrors may be placed in parallelism with the principal stresses in the specimen.

The light, which has now been deviated back to the optical axis is passed through lens L2 which is mounted on the optical axis within a bushing 21 about which disc 20 rotates. Lens L2 serves to focus the light beam upon a fixed aperture 22 which restricts the field of view. The light beam then passes through a further lens L3 and is converging as it passes through a second quarter wave plate 23 which is located in an adjustable mount 24. Quarter wave plate 23 is oriented with its axis parallel to the axes of the elliptically polarized light.

Quarter wave plate 23 serves to linearly polarize the light beam and the linearly polarized light is angularly displaced from the initial plane of polarization by an amount proportional to the retardation introduced by the stresses within the specimen.

The linearly polarized light then passes through an optical analyzer plate 25 (a plane polarizing plate) and thence through lens L4 which serves to focus the light beam on a multiplier photocell 27 which is located on the optical axis 0—0. Analyzer 25 will pass linearly polarized light except when the light is oriented in line with the extinction plane of the analyzer. As the linearly polarized light is displaced from this extinction plane of the analyzer the amount of light transmitted increases rapidly with respect to the displacement to a maximum value.

The analyzer 25 previously referred to is mounted for rotation about the optical axis, and is driven by a servomotor 30 receiving signals from an electrical system to be more fully described hereinafter. Analyzer 25 is secured within a ring 26 having teeth 26a about the periphery thereof. Ring 26 is journalled for rotation in a mount bushing 25a. Teeth 26a on ring 26 are engaged by a worm gear 28a on shaft 28, the latter being driven by servomotor 30 through gear train 29. A second worm gear 33 on shaft 28 engages with toothed gear 32 with the latter driving a multiturn potentiometer 34 through a second shaft 33. Adjustment knobs 33a and 33b are provided manual indexing of the potentiometer 34 and the analyzer 25. It is therefore seen that rotation of servo-motor 30 causes corresponding rotation of analyzer 25 and potentiometer 34.

Servo-motor 30 receives command signals from a servo-amplifier 51 through leads 51a and a line signal from power source P through leads 52b. Amplifier 51 receives signals from the following system. Multiplier photocell 27 as shown previously, receives any light transmitted through the analyzer 25 and emits a signal having a strength corresponding to the intensity of the transmitted light. Multiplier photocell 27 is provided with a high voltage D.C. source of accelerating potential 35, the potential supplied thereby being applied to photocell 27 via a lead 36 connected to the negative side of the source 35 and to the phototube cathode and a positive lead 37 connected to the phototube anode. The secondary winding of a transformer 38 is serially connected in the negative lead 36 and the primary of the transformer is supplied via leads 39 from the power source P. The turns ratio of transformer 38 is chosen such that a potential of approximately 25 volts appears across the secondary thereof. The accelerating potential applied to the photocell 27 thereby has an alternating component superimposed thereon, and since the amplification factor of a multiplier photocell varies in accordance with variations in the applied accelerating potential, multiplier photocell 27 emits a signal having a corresponding alternating component thereon when light is incident thereon. The A.C. component of the photocell output will be in phase with the line signal from source P and the amplitude thereof will be proportional ,o the intensity of the light passing through the analyzer 25. The photocell output, hereafter called the error signal is fed to an amplifier 44 via lead 37a from the tube output terminal and the lead 37 which is common to the anode. Amplifier 44 filters out the D.C. component of the error signal and amplifies the A.C. component thereof.

The amplified signal is then fed into a unit 47 which combines the amplified error signal with an auxiliary signal, the latter having a phase opposite to the phase of said error signal. The auxiliary signal has its source at power source P and is reduced to about 6.3 volts by auxiliary signal transformer 48. The low voltage signal is then fed into a phase shifting unit 49. The auxiliary signal is controlled by the phase shift unit 49 such that said signal has the same frequency as the error signal, but is exactly opposite in phase with amplitude about one-half the amplitude of the maximum error signal. When the error and auxiliary signals are combined in unit 47, the resultant signal has a phase corresponding to the greater of the two. The resultant is then fed into the servo amplifier 51 referred to previously. The servo motor 30 may be a Muirhead Type 18M 10D9 Servo Motor in conjunction with amplifier 51 which is a Muirhead Type D-985-A Servo Amplifier, the latter requiring a 24 volt D.C. power supply 50.

If the error signal from photocell 27 is equal in amplitude to the amplitude of the auxiliary signal, the resultant is zero and the servomotor is stopped i.e. the servo-system is at its balanced position. Should the error signal increase or decrease in amplitude relative to the auxiliary signal due to a change in the retardation angle of the light passing through the analyzer 25, the servo motor 30 will rotate the analyzer 25 to decrease or increase the amount of light passing through the latter until sufficient light is received by photocell 27 such that the amplified error signal equals in amplitude the auxiliary signal (i.e. until the balance point is reached). The balance position of the analyzer will therefore be offset from the extinction position by an amount proportional to the amplitude of the auxiliary signal and servo-motor 30 will rotate in a direction determined by the phase of the resultant signal with respect to the line signal should the system become unbalanced.

As stated previously, the light received by the analyzer is linearly polarized and its orientation angle varies in accordance with variations in retardation which have taken place in the specimen by virtue of stress variations in the latter. Since the analyzer is continually moved to the balance point in accordance with changes in the orientation angle of the light received by it, a plot of the motion of the analyzer gives a picture of the stresses within the specimen.

The stress distribution within a specimen is recorded on an XY recorder, the Y displacement of which is proportional to the orientation of analyzer 25, while the X displacement is driven in synchronism with the movement of the sheet specimen as the latter moves along the scanning path A-B.

The voltage supply for the XY recorder 74 (Houston model with modified drive) is conveniently taken off from the error signal amplifier 44 and fed through the multi-turn potentiometer 34 (preferably 10 turn 5000 ohm) coupled to the analyzer. The voltage output of the potentiometer 34 is tapped by either one of two calibration potentiometers 70 and 71 which are selected by a calibration selector switch 72 and the output is then fed into the Y input of the recorder.

The X displacement of recorder 74 is driven preferably by a synchronous transmitter 52 the output of which is fed via leads 75 to synchronous receiver 59, on the recorder 74. A Muirhead Synchro Transmitter Type 23TX6a in conjunction with a Muirhead Synchro Receiver Type 23TR6a were found to give satisfactory results for the above operation. The transmitter 52 is driven through gear train 53 by a chain drive 54 which moves in accordance with the motion of a scanning frame. The scanning frame is illustrated in FIGURE 7 and includes a carriage 63 from which the specimen S to be scanned is suspended. Wheels 65 permit carriage 63 to roll smoothly along tracks 64 which are positioned parallel to the scanning path A-B. A motor 60 rotates a threaded shaft 61 and the latter engages carriage 63 and propels it along tracks 64 at a desired rate of speed. Switches (not shown) may be used to reverse motor 60 to drive the carriage 63 and specimen S in either direction. A continuous chain 54 is brought around a pair of sprockets 66, 67 one of the latter being connected to the gear train 53. The chain is fixed to the carriage, such that movement of the carriage moves the chain and sprockets hence causing corresponding movement of the synchronous transmitter 52 which, in turn, sends a signal to receiver 59 and drives the X displacement of the recorder 74.

Thus as the scanning carriage 63 moves specimen S along path A-B through the field of view of the optical system, the X displacement of recorder 74 is driven in synchronism therewith and at a rate proportional thereto. The Y displacement will be proportional to the voltage output of potentiometer 34 and will indicate the orientation of analyzer 25.

By the above means a record of the analyzer orientation and hence retardation in the specimen being scanned as a function of distance along the direction of scan is obtained.

In order to obtain the principal stresses by the method of oblique incidence, two plots of retardation along the specimen must be obtained in order to solve Equations 5 and 6 simultaneously. By means of the rotating mirror system described earlier, two retardations at the same point on the specimen can be measured.

Assuming that the specimen that is to be analyzed is for example, a flat disc, the first step is to determine the direction of the first and second principal stresses therein. This may be done by isoclinic examination. The specimen is then placed in the scanning carriage and the mirror system i.e. mirrors 14, 15, 18 and 19 are rotated about the optical axis until they are in parallelism with one of the principal stresses. The quarter wave plate is oriented as described earlier. Since the specimen is circular it is desirable to scan from the center of the disc outwardly. The first scan is then made utilizing one of the calibration potentiometers i.e. 70. A second scan is made with the mirrors parallel to the second principal stress using the second calibration potentiometer 71. By subtracting the two curves thus obtained the principal stress along the path of scan may be found. The calibration potentiometers will be set at values corresponding to the value of the constant terms in the two equations given previously. The second principal stress is found from two additional scans made in similar fashion with the calibration potentiometers reversed and their settings in accordance with the constant terms in the equation under consideration.

In order that successive scans may be started from the same point, a telescope 77 is provided, which along with mirror 76 enables viewing of the sample S and the fixed aperture 22 along the path of the light beam.

FIGURE 5 is a graph illustrating application of the oblique incidence technique in determination of the individual components $p$ and $q$, which in this instance represents the tangential and radial stress components, taken along a radius of a circular disc as a function of distance from the centre of the disc.

Figure 6:
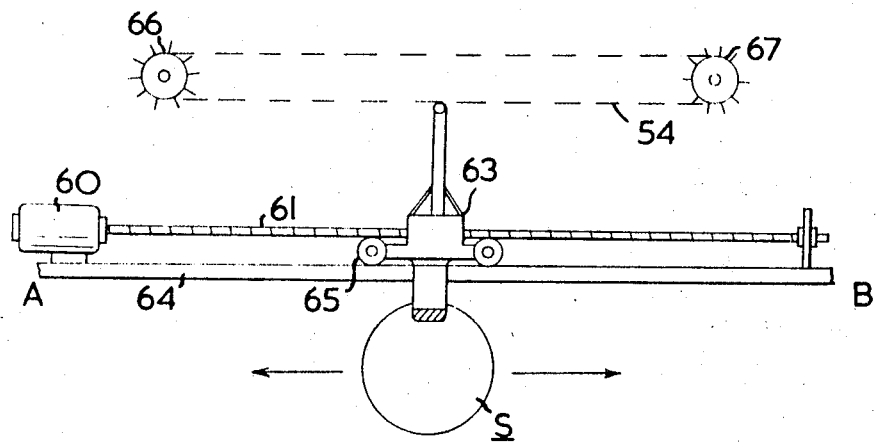
FIGURE 6 is a view of a scanning frame.

FIGURE 6 illustrates the stresses within the specimen from which the plot of FIGURE 5 was obtained. Since the method assumes a two-dimensional stress system only the radial stress component $O_r$ and the tangential stress component $O_t$ are detected. It will be noted here that the method described assumes that the direction of the principal stress components is constant within the area examined. Furthermore the stress gradient must not exceed that which can be resolved within the field of view of the instrument, since complete extinction within the field must be obtained if the system is to reach a balance point.

Although the invention has been described with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim:
1. In a device for analyzing the stresses in a transparent sheet of material, means for moving said sheet material along a selected path, means for directing a beam of polarized light at a selected angle to the surface of said moving sheet with at least a portion of the light beam passing through said sheet being elliptically polarized in response to stresses in the sheet, optical means converting the elliptically polarized light emanating from the sheet to a linearly polarized beam, said linearly polarized beam having an angular orientation which varies in accordance with changes in the magnitude of the stress in said sheet material, optical analyzer means mounted to intercept the linearly polarized beam, said analyzer being rotatable between a position wherein the linearly polarized light is extinguished and another position wherein at least a portion of the linearly polarized light is passed therethrough, with the intensity of the transmitted light being proportional to the degree of displacement between said another position and the extinction position of said analyzer, a servo-motor for rotatably driving said analyzer, a multiplier phototube and means for supplying accelerating potential thereto, said phototube positioned to receive light transmitted through said analyzer and emitting an error signal having magnitude proportional to the intensity of the light received thereby, means causing said error signal to fluctuate, means producing and superimposing on said error signal a fluctuating auxiliary signal having a frequency equal to the frequency of the error signal and a phase opposite thereto, and means feeding the resultant of said superimposed signals to said servo motor, said resultant signal being in phase with the greater one of said superimposed signals, said servo motor being adapted to rotate in a direction determined by the phase of the resultant signal fed thereto and to seek a null position whereby the analyzer is rotated in accordance with the changes in the orientation of said linearly polarized light in a direction to distinguish tension from compression stresses in said material, the improvement wherein said means causing said error signal to fluctuate comprises means for supplying and superimposing an alternating potential on the accelerating potential supplied to said phototube, said last mentioned means being arranged to supply said alternating potential at a frequency sufficiently low as to cause the amplification factor of said phototube to fluctuate with a frequency equal to the frequency of said alternating potential whereby the error signal output of the phototube has a frequency equal to the frequency of the superimposed alternating potential and an amplitude proportional to the intensity of the light received thereby.

2. The device as set forth in claim 1 including means for recording the angular position of said analyzer as a function of the amount of movement of the sheet material along said path.

3. A device for analyzing stress in a transparent sheet of material, comprising; conveyor means for moving said sheet along a selected path, means directing a beam of initially polarized light through the moving sheet of said material at a selected angle to the surface thereof, optical means converting the elliptically polarized light components passing through said sheet to a linearly polarized light beam which is angularly disposed in accordance with the stress in the sheet, an optical analyzer mounted in the path of said linearly polarized beam and being rotatable between a position wherein the linearly polarized beam is extinguished and position wherein at least a portion of the linearly polarized beam is transmitted with an intensity proportional to the degree of angular displacement between said linearly polarized beam and the extinction position of the analyzer, means for receiving said transmitted light and emitting an error signal responsive to the intensity thereof, said last means comprising a multiplier phototube, said multiplier phototube including means supplying a high voltage accelerating potential thereto and means for effecting fluctuation of said accelerating potential at a predetermined frequency to cause the amplification factor of said phototube to fluctuate thereby causing the error signal emitted by the phototube to fluctuate, means producing an auxiliary signal of constant amplitude having equal frequency and a phase opposite to that of the error signal, means superimposing said signals and means feeding said superimposed signals to said servo-motor, said servo-motor being responsive to the phase of the superimposed signals and rotating said analyzer to increase or decrease said degree of angular displacement and seek a balance point such that said fluctuating error signal bears a predetermined relationship with respect to said auxiliary signal, and means recording the position of said analyzer as it is moved to maintain a balance thereby giving an indication of stress in said sheet.

References Cited

UNITED STATES PATENTS

| | | | |
|---|---|---|---|
| 2,046,045 | 6/1936 | Walters | 88—14 |
| 2,244,318 | 6/1941 | Skellett | 250—207 |
| 2,411,848 | 12/1946 | Camras | 315—176 |
| 2,976,764 | 3/1961 | Hyde et al. | 250—225 |
| 2,993,402 | 7/1961 | Dunipace et al. | 250—225 |
| 3,124,637 | 3/1964 | Heitzer | 250—225 |
| 3,158,675 | 11/1964 | Murray et al. | 250—225 |
| 3,274,882 | 9/1966 | Kreiger et al. | 250—225 |

JAMES W. LAWRENCE, *Primary Examiner.*

D. O'REILLY, *Assistant Examiner.*

U.S. Cl. X.R.

250—222, 224, 225; 88—14